United States Patent [19]
Lepior et al.

[11] Patent Number: 6,011,586
[45] Date of Patent: *Jan. 4, 2000

[54] LOW-PROFILE IMAGE FORMATION APPARATUS

[75] Inventors: Bill Lepior, Castro Valley, Calif.; E. John McGarry, Portland, Oreg.; Fariborz Rostami, Menlo Park; Gilbert Chiang, San Francisco, both of Calif.

[73] Assignee: Cognex Corporation, Natick, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/759,497

[22] Filed: Dec. 4, 1996

[51] Int. Cl.$^7$ .................................................. G02B 13/16
[52] U.S. Cl. ............................................. 348/335; 348/94
[58] Field of Search .................................. 348/87, 94, 95, 348/126, 340, 335; 382/145, 147, 151, 152, 313, 323; 250/208.1, 216, 559.46; 356/399, 400

[56] References Cited

U.S. PATENT DOCUMENTS

| | | | |
|---|---|---|---|
| 354,482 | 11/1886 | Wilks, Jr. ................................. | 356/244 |
| 4,353,087 | 10/1982 | Berry et al. .............................. | 348/87 |
| 4,457,664 | 7/1984 | Judell et al. . | |
| 4,618,938 | 10/1986 | Sandland et al. ...................... | 348/126 |
| 4,677,474 | 6/1987 | Sato et al. ............................... | 348/87 |
| 4,686,565 | 8/1987 | Ando .................................... | 348/126 |
| 4,900,153 | 2/1990 | Weber et al. ........................... | 356/430 |
| 5,043,589 | 8/1991 | Smedt et al. ............................ | 356/392 |
| 5,177,559 | 1/1993 | Batchelder et al. ..................... | 356/237 |
| 5,208,463 | 5/1993 | Honma et al. .......................... | 356/394 |
| 5,276,546 | 1/1994 | Palm et al. .............................. | 348/126 |
| 5,369,492 | 11/1994 | Sugawara ................................ | 348/126 |
| 5,381,234 | 1/1995 | Barbee et al. .......................... | 356/369 |
| 5,499,112 | 3/1996 | Kawai et al. ............................ | 358/475 |
| 5,627,913 | 5/1997 | Spigarelli et al. ....................... | 348/87 |
| 5,825,499 | 10/1998 | Biedermann ............................ | 356/394 |
| 5,825,913 | 10/1998 | Rostami et al. ......................... | 382/151 |
| 5,981,656 | 1/1992 | Baker et al. ............................. | 348/87 |

*Primary Examiner*—Tuan Ho
*Assistant Examiner*—Aung S. Moe
*Attorney, Agent, or Firm*—Russ Weinzimmer; Anthony L. Miele

[57] ABSTRACT

An apparatus is provided for forming an image of the periphery of an object with a camera having optics disposed at a working distance that is significantly less than the focal length of the optics, without introducing image distortion. The invention provides an image formation apparatus having a reduced effective profile height by exploiting a folded optical path to provide reduced working distance between a camera and an object of interest, such as a semiconductor wafer, as compared with direct viewing of the object. In a preferred embodiment, the invention includes two reflecting substrates, a first reflecting substrate and a second reflecting substrate. The distance between the first and second reflecting substrates determines the number of times the light rays that form the image will bounce therebetween, and consequently, the number of images of an object periphery that will appear in the field of view (FOV) of the camera. The invention provides an image formation system that can operate within the small or narrow enclosures of some existing wafer fabrication equipment. The invention also provides reduced camera vibration.

13 Claims, 10 Drawing Sheets

LOW-PROFILE IMAGE FORMATION APPARATUS

FIELD OF THE INVENTION

This invention relates generally to machine vision, and specifically to image formation systems for viewing the periphery of an object, such as a semiconductor wafer.

BACKGROUND OF THE INVENTION

Commonly, semiconductor wafers are aligned prior to operations such as wafer probing, wafer stepping, wafer reading, wafer processing, etc. To achieve alignment of the wafer, two points on the wafer must be found; the location of the wafer center and the location of a wafer orientation feature, such as a notch or a flat cut into the typically round perimeter of the wafer, as shown in FIGS. 1A and 1B.

Opto-mechanical methods are known for finding an orientation feature cut into the perimeter of a wafer. For example, it is known to direct light from a laser or LED array at a point on the perimeter of a wafer. The wafer is then rotated, while repeatedly measuring the radial position of the wafer edge using the directed light. After rotating through about one revolution, there is sufficient information regarding the radial position of the edge that at least an approximate position of the center of the wafer can be ascertained using a known circle-fitting equation.

Once a circle is fit to the radial position information, points that significantly deviate from the circle are analyzed to localize the flat (or notch) of the wafer. With the wafer center and flat (or notch) locations known, the wafer handling equipment can then place the wafer accurately for execution of the next operation.

Electro-mechanical devices are also known for determining the orientation of a wafer, such as the apparatus disclosed in U.S. Pat. No. 4,457,664.

U.S. patent application Ser. No. 08/503,574, filed Jul. 18, 1995, entitled SYSTEM FOR FINDING THE ORIENTATION OF A WAFER, assigned to Cognex Corporation, teaches a machine vision method for automatically determining the location of center of a wafer and the flat (or notch) of the wafer. Use of this method dramatically reduces contact with and handling of the wafer necessary to locate the center and orientation feature of a wafer, while also significantly reducing the time required to perform these operations. By reducing the amount of wafer handling, the likelihood of contamination of the wafer is reduced. By decreasing the time needed to analyze information regarding the coordinates of points along the circumference of the wafer, parts can move more efficiently from place to place in the wafer fabrication facility, thereby increasing the throughput of the fabrication facility.

FIG. 2 shows a video camera 24 with standard optics 32 for capturing a wafer image to be processed by a machine vision system (not shown). Here, the wafer 30 is viewed by the camera 24 directly, the camera 24 and optics 32 alone serving as an image formation system. The focal length of the optics 32 determines the camera working distance $d_W$ 34, i.e., the direct distance from the optics 32 of the video camera 24 to the surface of the wafer 30.

Effective camera height $EC_H$ is defined as the minimum enclosing distance 35 between two hypothetical parallel plates 36 and 38, each plate also being parallel to the surface of the wafer 30. In FIG. 2, for example, where the camera is oriented perpendicularly to the wafer surface, the effective camera height 35 is simply the length of the camera (including the lens 32). If the camera were oriented 45 degrees with respect to the wafer surface, for example, the effective camera height $EC_H$ would be the distance between the hypothetical plates 36 and 38, where the hypothetical plate 36 just touches the top corner of the camera 24 that is farthest from the wafer 30, and the hypothetical plate 38 just touches the bottom corner of the camera 24 (including the lens 32) that is nearest to the wafer 30.

The effective profile height $EP_H$ 40 of an image formation system is herein defined as the minimum enclosing distance between the surface of the wafer 30 and a hypothetical parallel plate 42 that encloses the farthest element of the image formation system. In FIG. 2, for example, where the image formation system consists solely of a camera 24 and its lens 32, and the camera 24 is oriented parallel to the direction of the working distance, the effective profile height $EP_H$ 40 is the distance of the hypothetical enclosing plate 42 that just touches a farthest point on the camera 24 from the surface of the wafer 30. Also, in this particular case, the effective profile height $EP_H$ 40 is also equal to the sum of the effective camera height 35 and the working distance 34.

Using a lens with an 8.5 mm focal length provides the shortest working distance that results in acceptable optical distortion. A shorter focal length would decrease the working distance, and therefore would decrease the effective profile height, but would also result in unacceptable image distortion.

However, even a camera positioned at this shortest working distance from the wafer, having acceptable image distortion, results in other problems. These problems include an inability to operate within small or narrow enclosures of some existing wafer fabrication equipment, due to an effective profile height $EP_H$ that cannot be accommodated within the enclosures of some existing wafer fabrication equipment. These problems also include difficulties achieving stability against motion of the camera with respect to the object under study when the camera is supported by an extended camera mounting arm. For example, when a mounting arm supports the camera at a distance range of between 20 inches and 25 inches from the wafer, the field of view (FOV) of the camera includes the entire wafer, but the camera may not be sufficiently stable against even small vibrations that can result in motion-induced image distortion.

SUMMARY OF THE INVENTION

The invention exploits a folded optical path to provide an apparatus for forming an image of the periphery of an object with a camera having optics disposed at a working distance from the object that is substantially shorter than the minimum working distance required without the use of a folded optical path, without introducing image distortion. The invention also provides reduced camera vibration.

The invention provides an image formation apparatus having a reduced effective profile height by exploiting the reduced working distance between a video camera and an object of interest, such as a wafer, as compared with direct viewing of the object. The reduced working distance can be a fraction of the focal length of the optical system of the video camera. For example, the invention can be used to reduce the working distance of the camera to a wafer from an initial working distance of between 14 inches and 18 inches, to a shortened working distance of about 5 inches.

According to one aspect of the invention, effective profile height of the image formation system can be further reduced by reducing effective camera height, such as by positioning the camera parallel with respect to a plane of the object to be viewed, using a 45 degree diagonal mirror, for example.

According to another aspect of the invention, the optical path is folded using a combination of substantially reflective surfaces, such as a plurality of mirrors. These mirrors can be made of any substantially flat and mechanically stable material, such as plastic, glass, half-silver mirror coated glass, polished aluminum, etc.

According to another aspect of the invention, effective profile height can be reduced by placing the camera between a pair of reflecting substrates that are used to provide the folded optical path.

In a preferred embodiment, the invention includes two reflecting substrates: a first reflecting substrate and a second reflecting substrate. The distance between the first and second reflecting substrates determines the number of times the light rays that form the image will bounce therebetween, and consequently, the number of images of an object periphery that will appear in the field of view (FOV) of the camera. A relatively complex image showing multiple nested periphery images results. However, using a preferred machine vision technique, such as the method disclosed in U.S. patent application Ser. No. 08/503,574, filed Jul. 18, 1995, entitled SYSTEM FOR FINDING THE ORIENTATION OF A WAFER, only one of the larger images of the object periphery is used to determine position of the object center and the position of an object orientation feature.

The invention allows an image formation system to operate within small or narrow enclosures of some existing wafer fabrication equipment, due to a relatively smaller effective profile height $EP_H$ that can be accommodated within the restrictive enclosures of some existing wafer fabrication equipment. Further, the image formation apparatus of the invention provides a field of view (FOV) that includes an undistorted image of an entire wafer.

An additional benefit of the invention, due to reduced effective profile height, is enhanced stability against motion and vibration of the camera with respect to the object under study by allowing the use of a shorter camera support member. The camera is sufficiently stable against at least small vibrations that can result in motion-induced image distortion, thereby improving image quality.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENTS

In general, the invention is useful for forming images of the periphery of an object, and particularly useful when such images must be formed within a limited space. The apparatus of the invention achieves this by exploiting a folded light path provided by an apparatus having an effective profile height that is significantly less than the effective profile height of an apparatus that does not exploit a folded light path. For example, the invention is useful for forming an image of the periphery of a semiconductor wafer, which image is then useful for finding the location of the center point of the semiconductor wafer, and an orientation feature, such as a notch or a flat in the circumference of the wafer. The invention is also useful in other applications where circumferential regions of a substrate are to be inspected, and where small effective profile heights due to reduced camera working distances are advantageous or necessary, such as magnetic storage media, and optical storage media, for example.

Figure 1A:
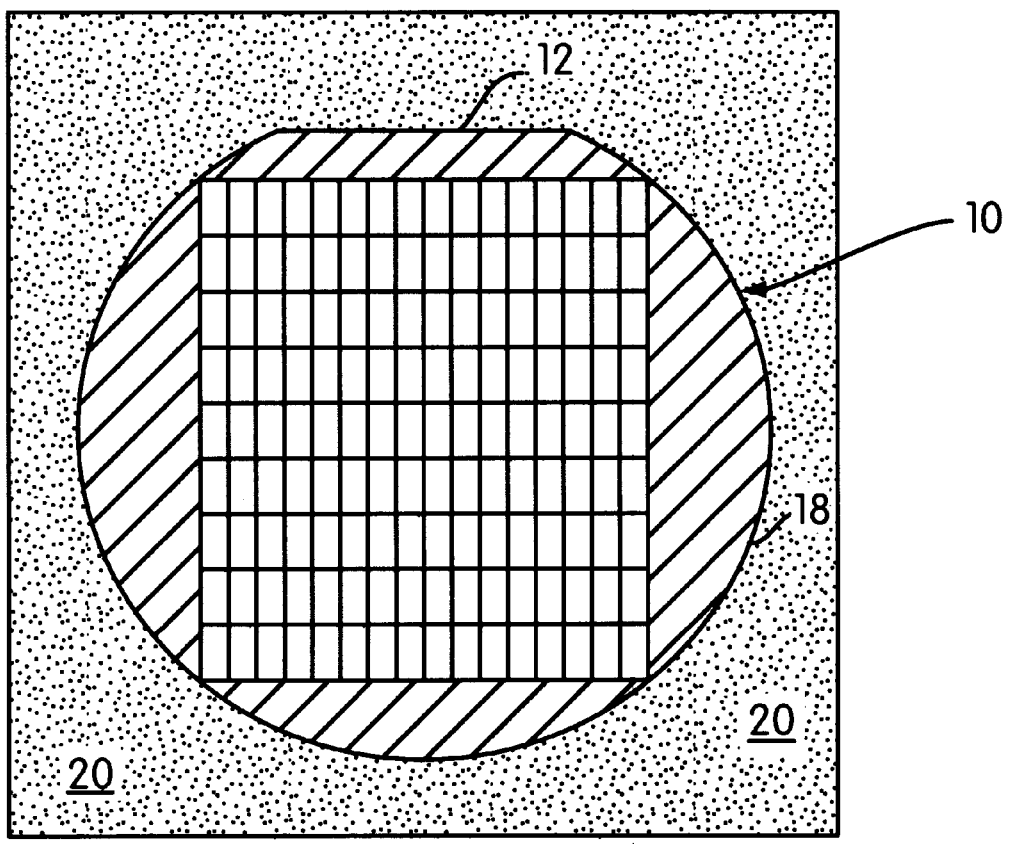
FIG. 1A shows a front-lit top-view of a wafer having a "flat" orientation feature.
Figure 1B:
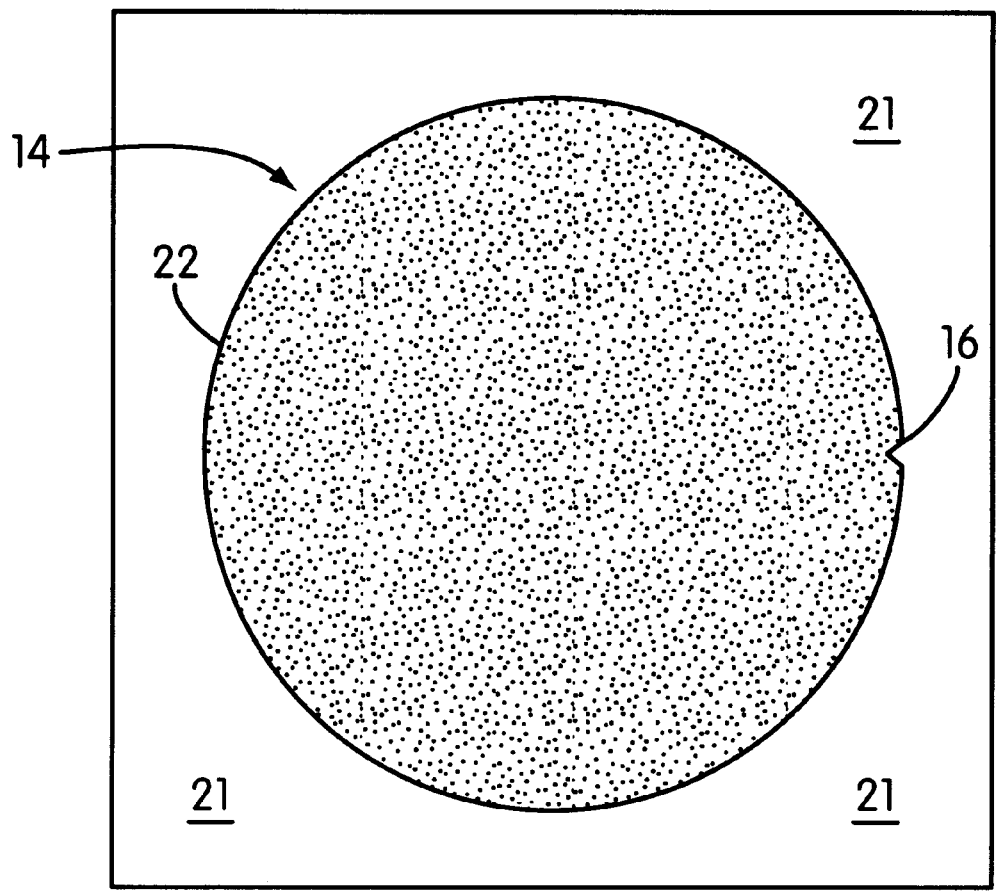
FIG. 1B shows a back-lit top-view of a wafer having a "notch" orientation feature.

Referring to FIG. 1A, an older, more traditional semiconductor wafer 10 includes a "flat" 12 in the periphery of the wafer 10 as an orientation mark, while FIG. 1B shows a newer wafer 14 that includes a "notch" 16 in the periphery of the wafer 14 as an orientation mark. A notch is typically found on newer eight-inch and larger wafers.

FIG. 1A also illustrates that a wafer illuminated with "front lighting" results in an image having a relatively bright circumferential edge 18 against a dark background 20, while FIG. 1B illustrates a wafer that is back-lit, i.e., the wafer 14 eclipses an extended diffuse light source 21 to provide an image having a high-contrast circumferential edge 22 that is a boundary between a dark region that represents the wafer 14, and a light region that represents the back light 21 behind the wafer 14.

Figure 2:
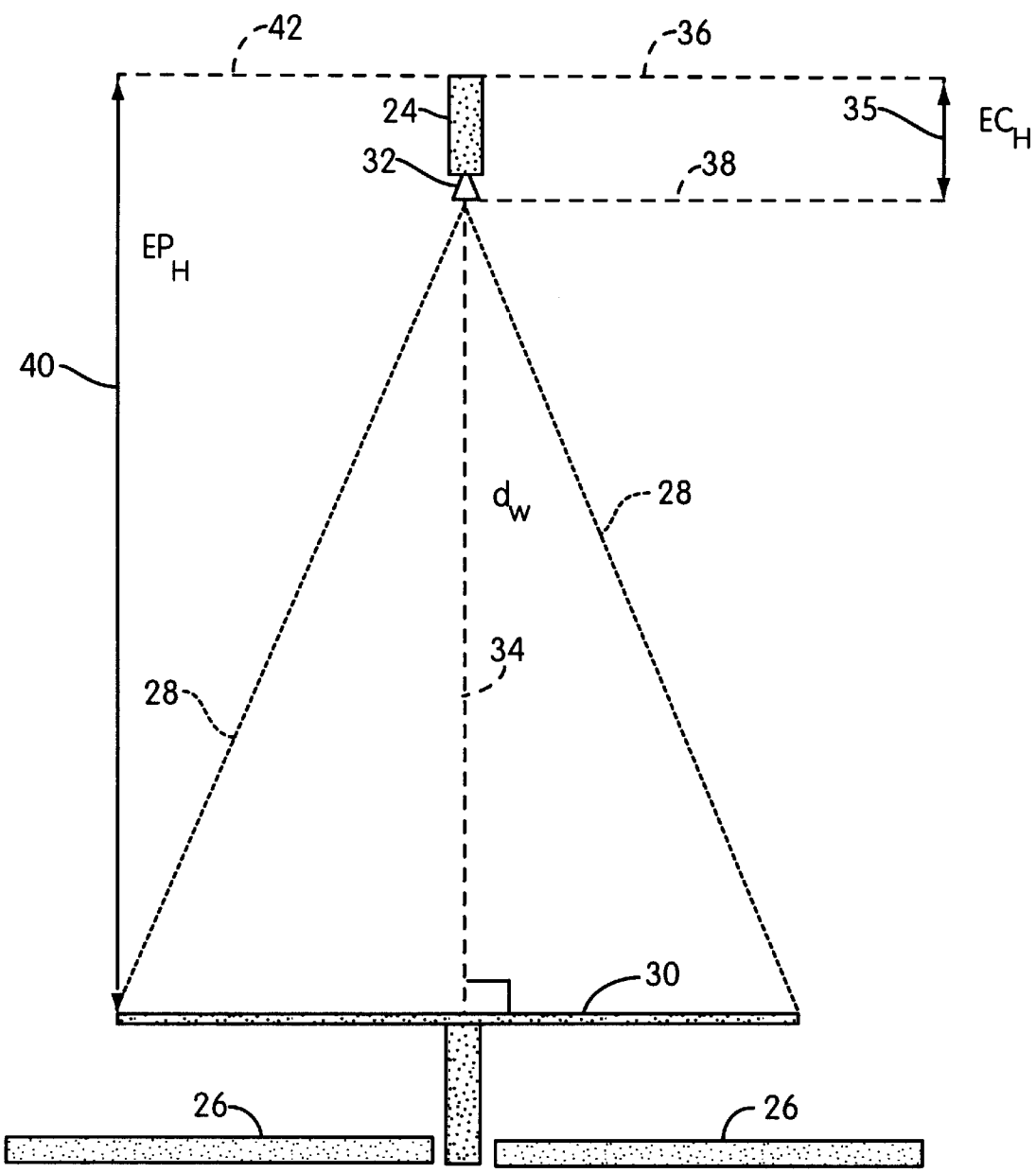
FIG. 2 is a side view of an image formation system for direct viewing of a wafer at a working distance $d_W$ for detecting a wafer orientation feature, such as a wafer flat or wafer notch, and for detecting the center of the wafer.

FIG. 2 shows a typical configuration of a standard image formation system including a video camera 24 supported by a mounting arm (not shown) in a position for direct viewing of the wafer 30. In this configuration, a back light 26 provides the necessary contrast to observe the peripheral edge of the wafer 30, but a front light could also be used. Note that there is a direct light path 28 from the wafer 30 to the optics 32 of the camera 24 that is cooperative with a machine vision system (not shown). The direct distance 34 from the optics 32 to an object of interest is called the "working distance" $d_W$. The working distance $d_W$ is not the same as the distance traversed by the light path 28. As shown in FIG. 2, the working distance $d_W$ is determined by measuring the perpendicular distance 34 between the optics 32 of the camera 24 and the surface of the wafer 30 nearest to the optics 32.

As an example, a camera having an 8.5 mm lens must be located at a working distance that falls within a range of 14 inches to 18 inches from an 8-inch wafer to provide an undistorted image of the entire wafer. However, even the shortest working distance of this range is too long, because such a working distance can result in too great an effective profile height $EP_H$, and therefore require more clearance space than is available in some manufacturing equipment, such as wafer handling or fabrication equipment.

Additionally, at even this shortest working distance of the range, e.g., 14 inches, the camera mounting arm (not shown) that supports the camera 24 is so long that the camera is sometimes not sufficiently stable against motion with respect to the object under study, e.g., a wafer, to avoid the undesirable result of a distorted image of the object.

FIGS. 3, 4, 5, and 6 show various embodiments of the image formation system of the invention, and more embodiments are possible. In these figures, a backlight source 46 was chosen as the light source to illuminate the perimeter of the object 30 under study, such as a semiconductor wafer, so as to establish sufficient contrast between the peripheral region of the object 30 and the background against which the object 30 is viewed. The object 30 is supported by a support 31.

The backlight source 46 can be implemented as a diffused incandescent or fluorescent light source, a fiber optic light source, an electroluminescent light source, or any other distributed illumination source. Note that any light source that gives a high contrast image having a detectable edge that corresponds to the perimeter of the object will work. Frontlight sources will also work, and are especially suited to applications where a feature that resides within the peripheral region of the object is to be imaged, such as an orientation feature printed or etched, for example, within the peripheral region of a completely round semiconductor wafer.

Figure 3:
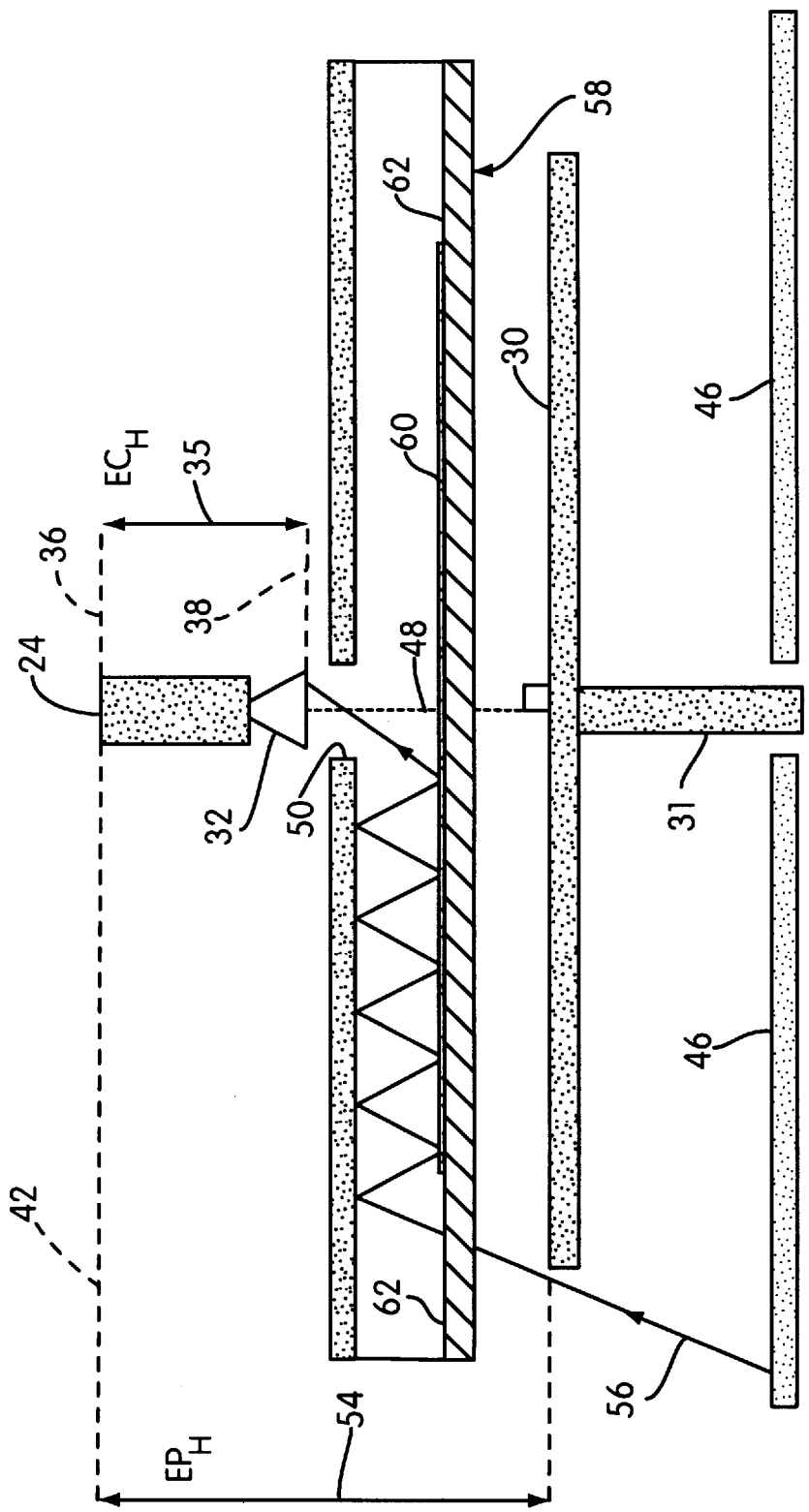
FIG. 3 is a side-view of a preferred embodiment of the image formation apparatus of the invention cooperative with a camera oriented perpendicularly with respect to both first and second reflecting substrates.

FIG. 3 shows an embodiment of the image formation apparatus of the invention cooperative with a camera 24 with a lens 32 supported by a mounting arm (not shown). The camera 24 is supported at a working distance 48 and in a position and orientation so as to directly receive light via the lens 32 after the light emerges from a central light transmissive aperture 50 of a first reflecting substrate 52. The central light transmissive aperture 50 preferably transmits substantially all incident light, such as the case where the aperture 50 is a hole in the first reflecting substrate 52, where the hole is completely devoid of substrate material, the region defined by the aperture 50 containing only air.

Additionally, other embodiments where the aperture 50 transmits significantly less than all incident light are also useful in applications where lower captured light levels are acceptable, such as when there is adequate time available to integrate a sequence of images captured through the aperture 50 over a period of time, for example. The aperture 50 can be partly light transmissive and partly light reflective, or partly light transmissive and partly light absorptive, or partly light transmissive, reflective, and absorptive, for example.

During operation of the image formation apparatus of the invention, an example light ray 56 emitted from a light source 46 is reflected by the first reflecting substrate 52 towards a second reflecting substrate 58 having a substantially reflecting central region 60, and a substantially transparent surrounding region 62. Many other rays are generated by the light source 46, a subset of which traverse a path through the apparatus of the invention to be captured by a camera 24. For example, a mirror image of the ray 56 could be drawn to the left of the support 31. The substantially transparent surrounding region 62 can be made of glass, or lucite, for example, and the substantially reflecting central region 60 can be a reflecting material, such as silver, deposited thereon. The shape of the substantially reflecting central region 60 is preferably similar to the shape of the perimeter of the object 30 under study. For example, in applications where the location of the center and an orientation feature of a mostly round semiconductor wafer are to be found using the apparatus of the invention, a reflecting central region 60 having a substantially round shape is preferable.

After the light 56 is reflected from the reflecting central region 60, and it moves toward the first reflecting substrate 52 again, to be reflected again towards the reflecting central region 60 of the second substrate 58. After repeated reflections between the two substrates 52 and 58, some of the reflected light 56 traverses the aperture 50 to be captured by the lens 32 of the camera 24. The resulting image captured by the camera 24 is shown in FIG. 7.

Figure 7:
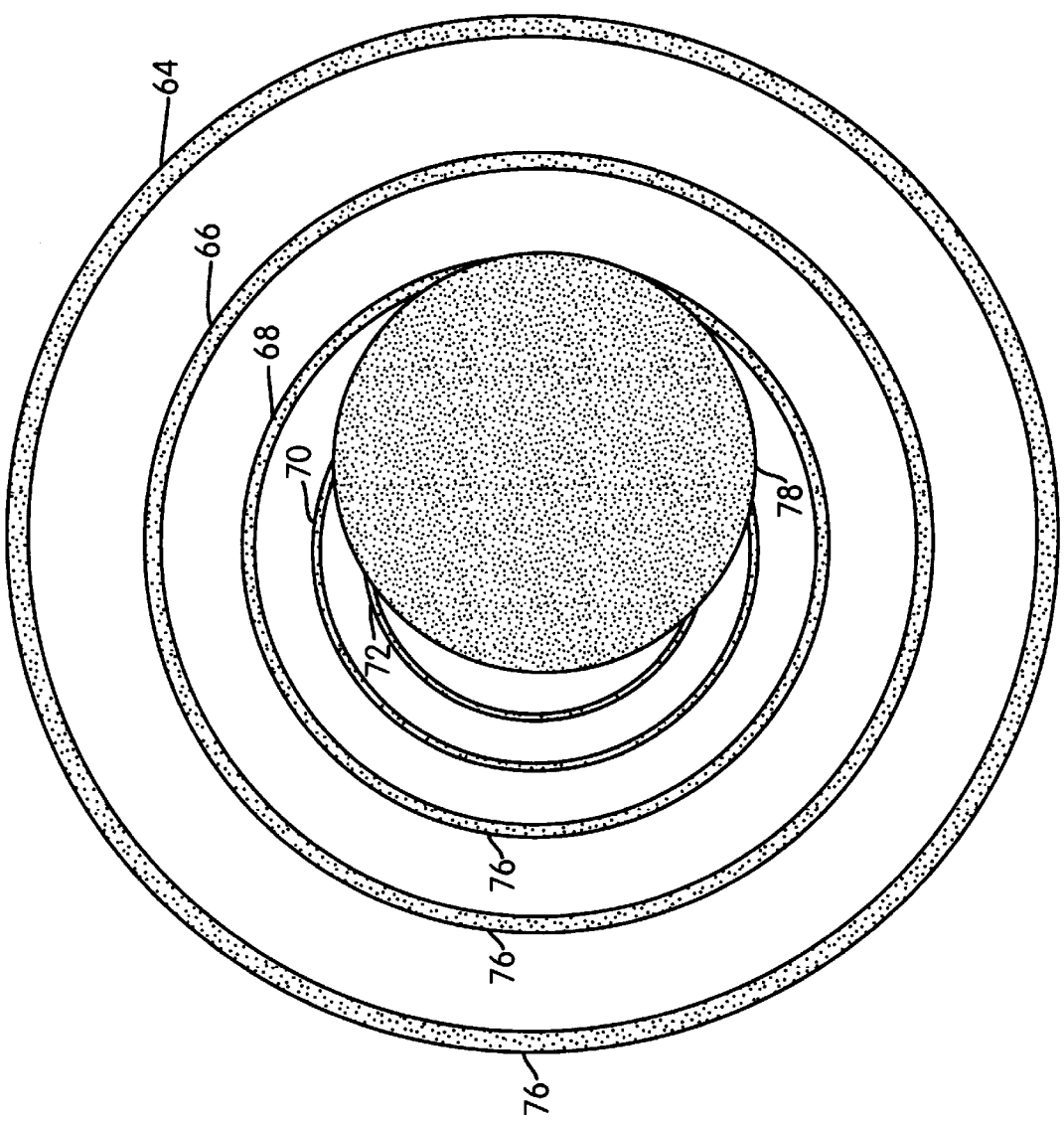
FIG. 7 is a sample image as seen by a camera that is cooperative with the image formation apparatus of the invention.

FIG. 7 shows that the camera 24 captures a plurality of nested images of the peripheral region of the object 30 under study. For example, FIG. 7 shows a plurality of nested images 64, 66, 68, 70, and 72 of the peripheral region of the semiconductor wafer 30 having a notch 76 as an orientation feature. For example, the largest image 64 of the peripheral region of the wafer 30 includes an image of the notch 76, as do the other images 66–72, albeit with decreasing size and resolution.

Each of the progressively smaller nested images 64, 66, 68, 70, and 72 can be used to determine the location of the wafer center, and the location of the wafer orientation feature, such as the notch 76. One way to achieve this is to use a machine vision technique, such as the method disclosed in U.S. patent application Ser. No. 08/503,574, filed Jul. 18, 1995, entitled SYSTEM FOR FINDING THE ORIENTATION OF A WAFER, the disclosure of which is herein incorporated by reference. Using this method, an image of only one of the larger concentric rings is needed to determine the position of the wafer center and the position of the wafer orientation feature.

An image 78 of the camera 24 obscures a portion of some of the nested images 66, 68, 70, and 72. If the first substrate and the second substrate were in perfect parallel relationship, the nested images 64–72, and the image 78 of the camera 24 would be concentric. Nevertheless, some machine vision techniques, such as the above-mentioned technique, do not require an image of the entire perimeter of the wafer to provide satisfactory position information, so even non-concentric images, and images where the perimeter of the wafer is partially obscured can be used.

Returning again to FIG. 3, the camera 24 is supported at a working distance 48 and in a central position and co-axial orientation, as shown. Note that the working distance 48 is less than the focal length of the lens 32 due to the folded light path 56. Although the effective camera height $EC_H$ 35 is the same, an image formation system including the camera 24 with the lens 32, and the image formation apparatus of the invention, has an effective profile height $EP_H$ 54 that is significantly less than the effective profile height $EP_H$ 40 of the prior art image formation system shown in FIG. 2, thereby providing a significant advantage over the prior art.

Figure 4:
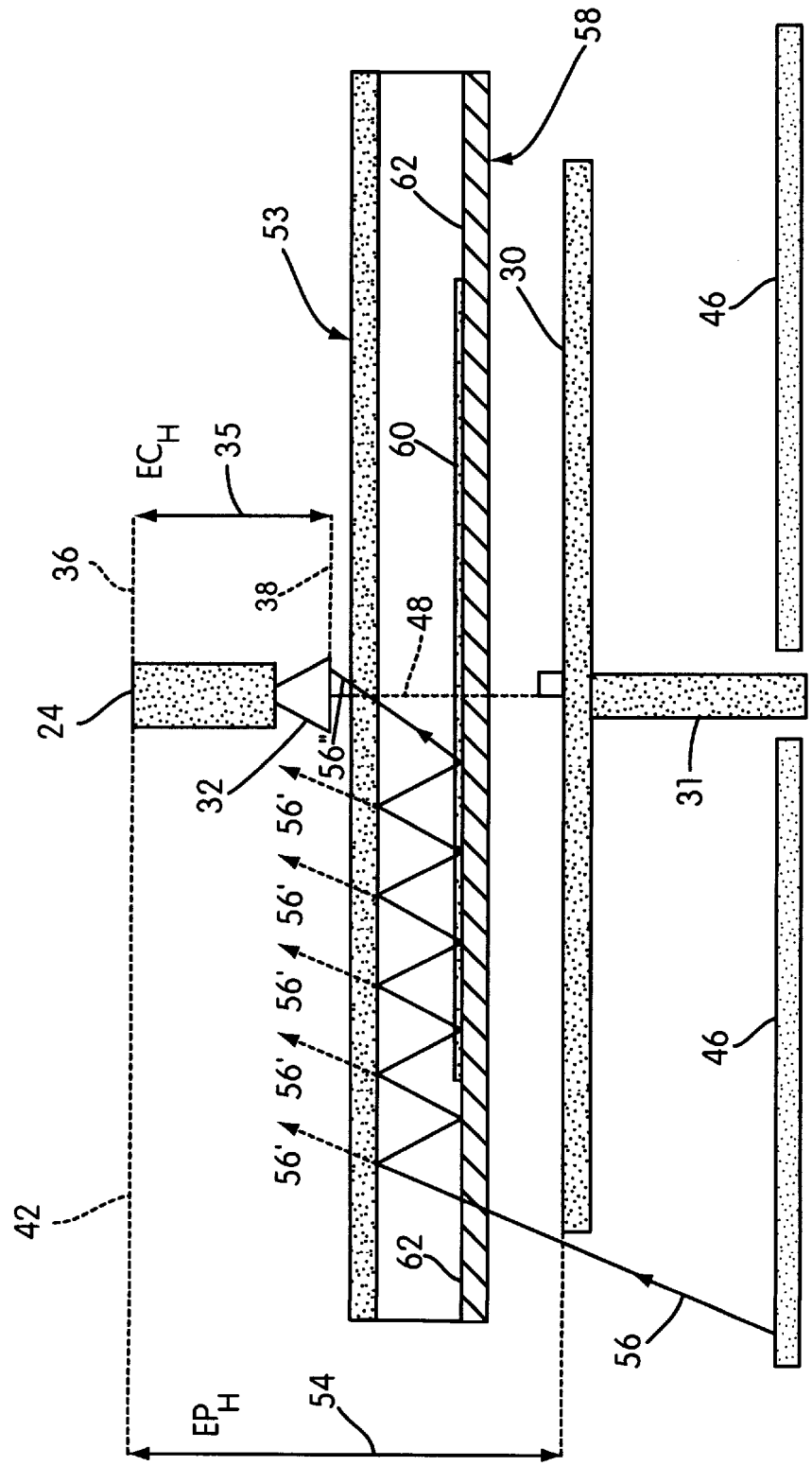
FIG. 4 is a side-view of a preferred embodiment of the invention cooperative with a camera oriented perpendicularly with respect to both first and second mirrors, the first mirror having at least a portion that is partially light-reflecting, and partially light-transmissive.

With reference to FIG. 4, an alternate embodiment employs a first reflecting substrate 53 that has both light reflecting and light transmitting properties over its entire extent. Upon each reflection of the light ray 56, a transmitted light ray 56' escapes from between the first and second substrates 53 and 58. Thus, the light ray 56 decreases in intensity with each fold (reflection) until the transmitted ray 56 enters the lens 32 of the camera 24. The image captured using this embodiment of the image formation apparatus of the invention will be of lesser intensity than of the embodiment depicted in FIG. 3.

Figure 5:
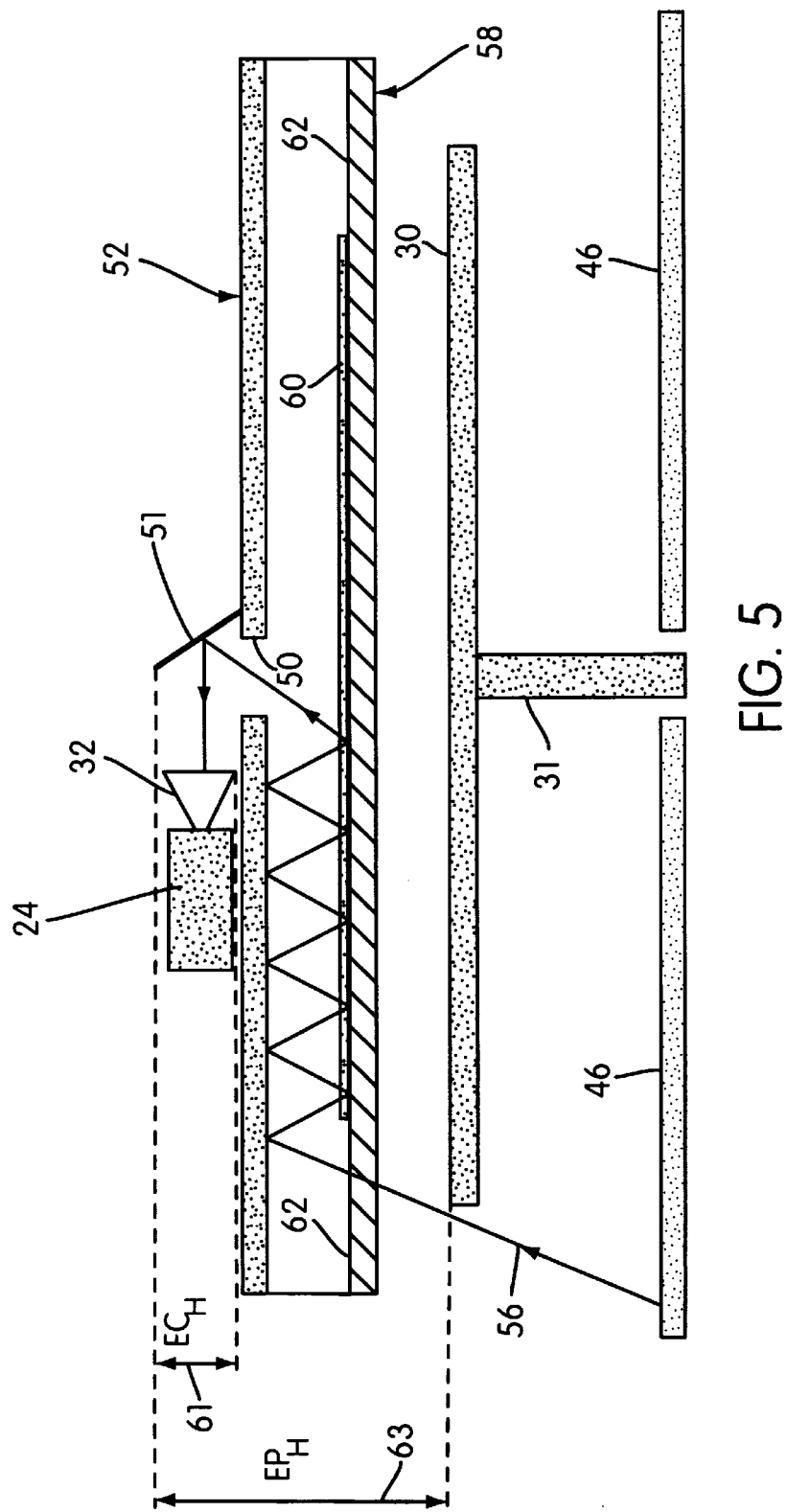
FIG. 5 is a side-view of a preferred embodiment of the invention cooperative with a camera oriented non-perpendicularly with respect to both first and second mirrors.

Referring to FIG. 5, yet another embodiment includes a mirror 51 fixed at an angle so as to enable the camera 24 to capture an image when it is disposed in a horizontal position rather than in a vertical position, as was the case in FIGS. 3 and 4. The advantage of this embodiment is that it is characterized by a smaller effective profile height $EP_H$ 63 due to a smaller effective camera height $EC_H$ 61. This embodiment is particularly useful in applications that can benefit from a further reduced effective profile height.

Figure 6:
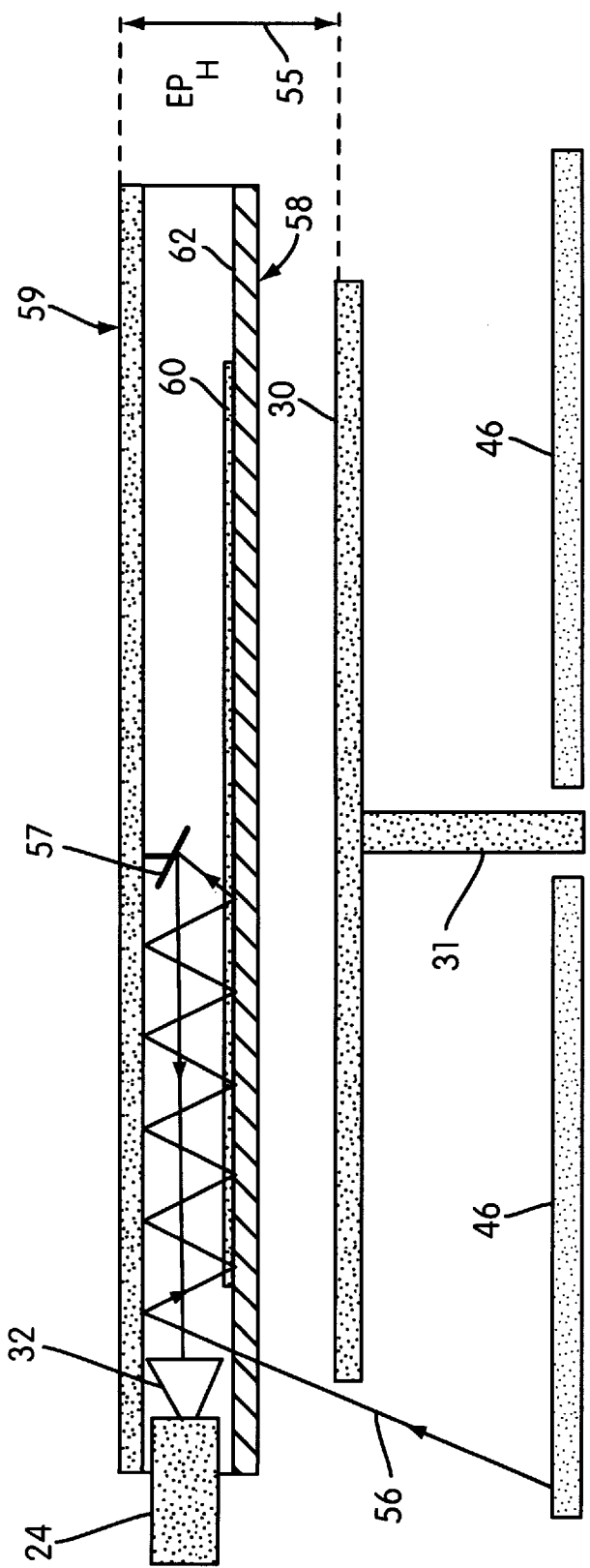
FIG. 6 is a side-view of a preferred embodiment of the invention cooperative with a camera oriented non-perpendicularly with respect to both first and second mirrors, within the planes of the two mirrors.

With reference to FIG. 6, yet further reductions in effective profile height $EP_H$ can be achieved by placing the camera 24 between a first reflecting substrate 59 and a second substrate 58. Note that the effective profile height $EP_H$ 55 is less than the effective profile heights $EP_H$ 63 and $EP_H$ 54. Also note that the first reflecting substrate 59 is completely reflecting, and does not include a light transmissive aperture. Instead, it includes a mirror 57 mounted thereto for reflecting an image towards the camera 24 for image capture, as illustrate by the path of the example ray 56. Although the camera 24, when placed in some positions between the first reflecting substrate 59 and a second substrate 58, may obscure a portion of the image, enough of the image is able to reach the camera to be useful in some applications.

Figure 8:
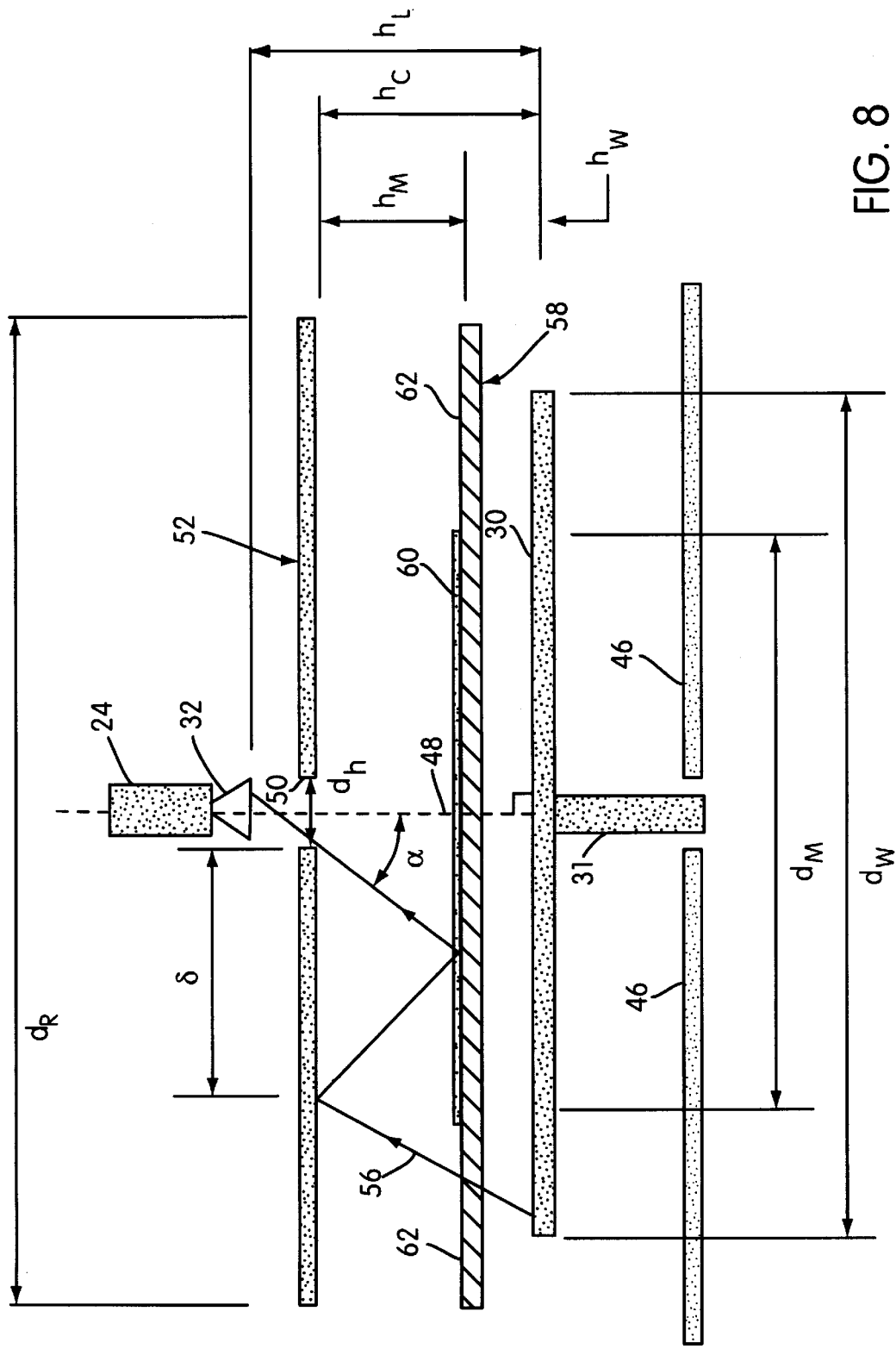
FIG. 8 is a side-view of the embodiment of FIG. 3 showing various dimensional parameters of the invention.

With reference to FIG. 8, further details of various dimensional parameters and spatial relationships of the components of the image formation apparatus of the invention will now be described. There exists a set of dimensional parameters of the apparatus of the invention, as shown in FIG. 8, having values such that all the images of the perimeter of the wafer 30, as shown in FIG. 7, are included within the field of view (FOV) of the camera 24. FIG. 7 illustrates that the distance between wafer perimeter images, and the intensity of the wafer perimeter images, are both less for images nearer to the center of the camera FOV. Both of these effects are a result of a greater number of reflections n, of a greater value of L, and of a smaller value of $\alpha$ for wafer perimeter images nearer to the center of the camera FOV. Here, $\alpha$ is the angle of the example light ray 56 with respect to the optical axis of the lens 32 of the camera 24, and L is the total distance traversed by the light path 56 from the wafer 30 to the lens 32.

Also, an image having the least distortion and the greatest separation between wafer perimeter images is achieved when $\alpha$ is greatest, and consequently when the distance between reflections $\delta$ is greatest, as shown in FIG. 8.

To serve as a working example, physical measurements were taken on a realized embodiment of the invention consistent with the equations set forth below. Two sets of measurements are shown in Table 1, below.

TABLE 1

| Lens | f-stop | $hW_{vis}$ | $hW_{nonvis}$ | $h_M$ | $h_C$ | $h_L$ | FOV @ .5 m |
|---|---|---|---|---|---|---|---|
| 8.5 mm | 5.6 | 16 mm | 28 mm | 71 mm | 64 mm | 115 mm | 300 mm |
| 16 mm | 8 | | 39 mm | 49 mm | 40 mm | 75 mm | 101 mm | 157 mm |

In Table 1, $hW_{vis}$ refers to the height $h_W$ of the second substrate 58 with respect to the wafer 30 where the wafer 30 is visible throughout the field of view (FOV), and $hW_{nonvis}$ refers to the height $h_W$ of the second substrate 58 with respect to the wafer 30 where the outer image in the FOV is an image of the reflecting region 60 of the lower reflecting substrate 58, and not an image of the wafer 30.

The values of Table 1 are consistent with the following equations, which can be used to specify the dimensions of a range of embodiments of the apparatus of the invention:

$$2[h_L + nh_M] \tan \alpha_C = d_W - d_L \quad \text{Equation 1}$$

$$2hW_{crit} \tan \alpha_C = d_W - d_M \quad \text{Equation 2}$$

where $d_L$ is the lens diameter and n is the number of folds (reflections) in the light path 56 (number of folds must be even), and where $hW_{crit}$ is the value of $h_W$ where the outer-most wafer perimeter image matches the inner image of the reflecting region 60 of the lower reflecting substrate 58. Also, $\alpha_C$ is the critical angle of the example light ray 56 with respect to the optical axis of the lens 32 of the camera 24, and is equal to arctan(([FOV@ distance]/2)/distance), $d_W$ is the diameter of the disk 30, $h_L$ is the height of the lens 32 above the wafer 30, and, $h_M$ is the height of the first reflecting substrate 52 above the second substrate 58. Further, $d_M$ is the diameter of the reflecting portion 60 of the second substrate 58.

Using an FOV @ 0.5 m, and an 8.5 mm lens: $\tan\alpha_C$=([FOV@ distance]/2)/distance=(300/2)/500=0.3, and therefore $\alpha_C$=16.7°. Thus, solving Equation 1 for n with $d_L$ held at zero yields: (115+n*48)*0.3+$d_L$/2=100, requiring that n≦4.55, and consequently that n=4, because the lowest even value closest to n is chosen, according to the invention. Then, using n=4, and solving Equation 1 for $d_L$ yields $d_L$=15.8 mm. Physical measurement of $d_L$ was 16 mm, thereby providing evidence of the correctness of Equation 1.

Equation 2 yield: $hw_{crit} * 0.3 = (100 - 85)/2 = 7.5$ $hw_{crit} = 25$ mm

Note that this satisfies the requirement $hW_{vis} < hW_{crit} < hW_{nonvis}$ based on measured values, as seen in Table 1.

Similarly, for the 16 mm lens, $\tan\alpha_C$=(157/2)/500=0.157, and therefore $\alpha$=8.9°

Equation 1 yields (101+n*36)*0.157+dL/=100 n≦14.9 or n=14. Further, $d_L$=10.3 mm, which calculation was confirmed by a physical measurement of 11 mm.

Equation 2 yield: $hw_{crit} * 0.157 = (100 - 85)/2 = 7.5$ $hw_{crit} = 48$ mm

Referring again to Table 1, note that this satisfies the condition: $hW_{vis} < hW_{crit} < hW_{nonvis}$.

Figure 9:
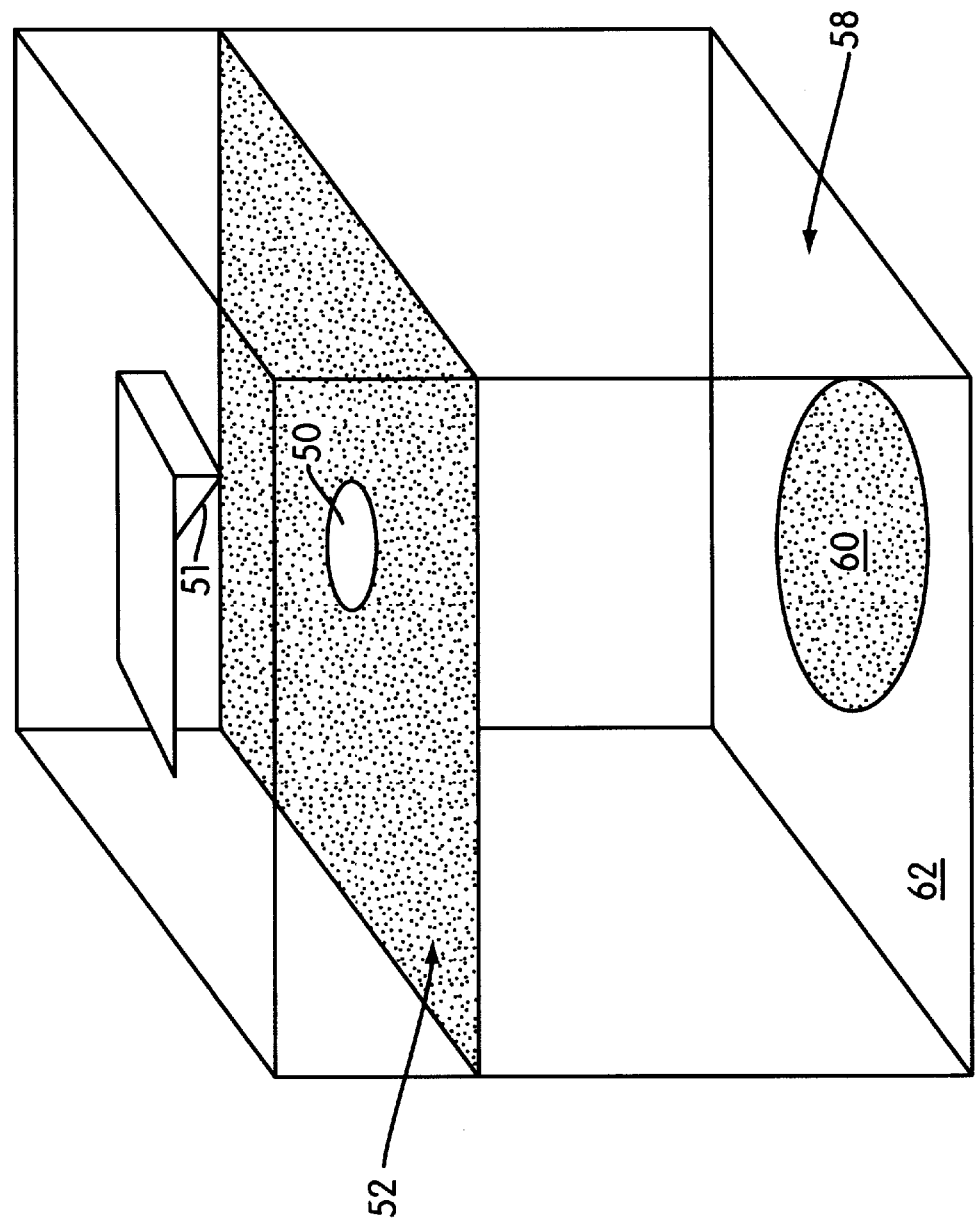
FIG. 9 is a perspective view of the embodiment of FIG. 5.

FIG. 9 is a perspective view of the image formation apparatus of the invention as embodied in FIG. 5. We now use Equations 1 and 2 to determine the values of the dimensional parameters of an embodiment of the apparatus of the invention. A preferred embodiment employs an 8.5 mm lens. To adapt the invention for use with wafer loading and unloading robots, clearance must be allowed for between the bottom of the apparatus of the invention and the wafer. The value of $h_M$ was desired to be a minimum; 75 mm was chosen. For robot end effector clearance, 50 mm was chosen for $h_W$. Thus $h_C = h_M + h_W = 125$ mm. For an 8.5 mm lens, $\alpha_C$16.7°, and so tan $\alpha_C$=0.3.

One can calculate the maximum allowable size for the reflecting portion 60 of the second substrate 58, $d_{Mmax}$, using Equation 2: $(d_W-d_{Mmax})/2=h_W \tan\alpha_C$, so $d_{Mmax}=170$ mm $d_M$ was chosen so that: $(d_W-d_M)/2=h_C \tan\alpha_C$, so $d_M=125$ mm Note: this allows an equal margin for error whichever way the wafer moves. Margin of error=$\pm h_M \tan\alpha_C=\pm 22.5$ mm The number of times the image is folded is approximately equal to: $(d_M/2)/h_M \tan\alpha_C=(125/2)/22.5=2.8$ folds, and since the number of folds must be an even number, 2 folds will be used.

From Equation 1: $[h_L+nh_M] \tan\alpha_C+d_L/2=d_W/2$ or $(h_C+(h_L-h_C)+nh_M) \tan\alpha_C+d_L/2=d_W/2$. Thus, $(125+(h_L-h_C)+2*75)*0.3+11/2.0=200/20$ or $(h_L-h_C)=12$ mm.

The minimum diameter $d_H$ of the hole 50 in the first reflecting substrate 52 is: $d_H=2*(h_L-h_C) \tan\alpha_C=7.2$ mm.

The size $d_R$ of the first reflecting substrate 52 must satisfy the condition: $d_R \geq d_M+2*(\text{error-margin})=200$ mm, and accordingly, for practical purposes, the size $d_R$ of the first reflecting substrate 52 is preferably 250 mm.

GLOSSARY $\alpha$ Angle of light path with respect to center line of the apparatus of the invention as light travels from the second substrate towards the first substrate $\delta$ Distance between the edge of the hole in the first reflecting substrate mirror and the first reflection therefrom $d_L$ Diameter of the lens of the camera $d_w$ Diameter of the wafer $d_m$ Diameter of the reflecting portion of second substrate $d_{Mmax}$ Maximum diameter of the reflecting portion of the second substrate FOV Field of view f-stop Aperture opening of the lens $hW_{vis}$ Value of hw where wafer is visible throughout the FOV $hW_{nonvis}$ Value of hw where outer image in the FOV is not that of the wafer but that of the image of the outer edge of the reflecting portion of the second substrate $hW_{crit}$ Value of hw where the most outer image in the FOV corresponds to that of the wafer $h_M$ Distance between the reflecting portion of the second substrate and the first reflecting substrate $h_C$ Distance between the wafer and the first reflecting substrate $h_L$ Distance between the wafer and the lens L Total distance folded light travels through the apparatus of the invention n Number of folds (reflections) in the light path from the wafer to the lens Other modifications and implementations will occur to those skilled in the art without departing from the spirit and the scope of the invention as claimed. Accordingly, the above description is not intended to limit the invention except as indicated in the following claims.

What is claimed is:

1. An apparatus for finding an orientation feature of an object, the apparatus comprising:

a camera located at a sub-focal-length working distance from the object;

a first substrate having a first reflecting surface of a first surface area, the first substrate and the first reflecting surface each including a region that is at least partially light-transmissive;

a second substrate having a second reflecting surface in confronting relationship with the first reflecting surface, the second reflecting surface being of a second surface area that is less than the first surface area; and a mechanism utilizing signals obtained from said camera to identify the orientation feature of the object and to determine the orientation of the object, wherein said camera, the object, and said first and said second substrates are arranged such that a plurality of nested images of a perimeter of the object are included in a field of view of said camera.

2. The apparatus of claim 1, wherein said second substrate is in substantially parallel relationship with said first substrate.

3. The apparatus of claim 1, further comprising:

a light-source for one of back-lighting and illuminating at least the periphery of said object.

4. The apparatus of claim 1, wherein said first substrate is separated from said second substrate by a distance sufficient to allow at least one reflection at said first reflecting surface and at least one reflection at said second reflecting surface.

5. The apparatus of claim 1, wherein said at least partially light-transmissive region is a hole through said first substrate and through said first reflecting surface.

6. The apparatus of claim 1, further comprising:

a reflecting surface for providing a view through said at least partially light-transmissive region to a camera oriented non-perpendicularly with respect to said first substrate.

7. The apparatus of claim 1, wherein said first substrate is partially light-transmitting and partially light-reflecting over substantially all of its area.

8. The apparatus of claim 1, wherein said second substrate further includes a substantially light-transmitting region generally surrounding said second reflecting surface.

9. The apparatus of claim 1, wherein said second substrate further includes a substantially light-transmitting region generally surrounding and supporting said second reflecting surface.

10. The apparatus according to claim 1, wherein said orientation feature identified by said mechanism comprises an orientation feature located at the periphery of the object.

11. The apparatus according to claim 1, wherein said second substrate comprises a central portion and an outer portion, said central portion comprising a substantially reflecting surface and said outer portion comprising a substantially transmissive portion.

12. An apparatus for finding an orientation feature of an object, the apparatus comprising:

a camera located at a sub-focal-length working distance from the object;

a first substrate having a first reflecting surface of a first surface area;

a second substrate having a second reflecting surface in confronting relationship with the first reflecting surface, the second reflecting surface being of a second surface area that is less than the first surface area; and a mechanism utilizing signals obtained from said camera to identify the orientation feature of the object and to determine the orientation of the object, wherein said camera is positioned between said first substrate and said second substrate to receive reflected light from a third reflecting surface.

13. The apparatus according to claim 12, wherein said camera, the object, and said first and said second substrates are arranged such that a plurality of nested images of a perimeter of the object are included in a field of view of said camera.

* * * * *